United States Patent [19]

Abed

[11] Patent Number: 4,677,605

[45] Date of Patent: Jun. 30, 1987

[54] FOCUS ACQUISITION AND MAINTENANCE FOR OPTICAL DISK SYSTEM

[75] Inventor: Majeed Abed, Boulder, Colo.

[73] Assignee: Storage Technology Partners II, Louisville, Colo.

[21] Appl. No.: 628,199

[22] Filed: Jul. 6, 1984

[51] Int. Cl.$^4$ ............................................. G11B 7/00
[52] U.S. Cl. ...................................... 369/45; 250/201; 369/46
[58] Field of Search .................... 358/342; 369/43–47; 250/201 DF

[56] References Cited

U.S. PATENT DOCUMENTS

| | | | |
|---|---|---|---|
| 4,290,132 | 9/1981 | Kotaka | 369/45 |
| 4,358,774 | 11/1982 | Wilkinson | 369/45 X |
| 4,425,043 | 1/1984 | Rosmalen | 369/45 X |
| 4,495,407 | 1/1985 | Kodama et al. | 369/45 X |

Primary Examiner—Robert L. Richardson
Attorney, Agent, or Firm—Woodcock Washburn Kurtz Mackiewicz & Norris

[57] ABSTRACT

Apparatus and methods are disclosed for acquiring and maintaining focus of a coherent light source used to read and write data in an optical disk data storage device. The system uses a conventional astigmatic focus system in conjunction with a signal processor to detect proximity of focus. After proximity of focus is detected, the signal processor enables a fine focus servo system to maintain focus of the coherent light on the disk surface. The system includes a coherent light source for reading and writing data on the optical disk storage medium, a condenser lens for focusing the coherent light on the recording surface of the disk, a cylindrical lens for passing light reflected from the recording surface, a quad light detector responsive to the reflected light from the cylindrical lens for providing an output signal, a controller responsive to the quad detector output signal for providing a control signal when proximity of focus is detected, and a fine servo system for controlling the position of the condenser lens. The system also includes a method of avoiding a false focus on any transparent overcoat layer placed over the recording surface of the optical disk storage medium.

14 Claims, 16 Drawing Figures

FOCUS ACQUISITION AND MAINTENANCE FOR OPTICAL DISK SYSTEM

BACKGROUND OF THE INVENTION

The present invention relates to optical disk data storage devices as used in the computer industry and video recording industry, and in particular to a focus servo apparatus for use in focusing the laser beam of such recording devices. Even more particularly, this invention relates to apparatus and methods of acquiring and maintaining focus of the laser read/write beam using an astigmatic focus system.

An optical disk used to record information in optical disk data storage devices is typically in the form of a circular disk plate of a transparent material with a thin layer into which a plurality of reflectivity changes are formed on and along a plurality of circular tracks arranged concentrically. The information is defined by the length of the reflectivity changes and the distance between the adjacent reflectivity changes. Information is written onto the disk by creating the reflectivity changes and the information is read from the disk by reflecting a beam off the thin layer and detecting the presence or absence of reflectivity changes along the circular track. A readout of the information recorded on the disk is usually performed by a system directing a light to the surface of the disk, detecting light reflected from the thin layer on the surface and modulated by the reflectivity changes, and demodulating the detected light. In a readout system of this type, a servo mechanism is necessary to control a lens system for focusing the incident light precisely on the reflection surface.

An example of the conventional focus servo mechanism which is used in read out systems is shown in FIG. 1. A light beam emitted from a light source, such as a helium-neon laser, is passed through a beam splitter, reflected off a mirror and condensed by a condenser lens to a point on the recording surface of the disk. The disk is rotated by a motor to create concentric tracks on the surface of the disk, and separate tracks are created by moving the mirror and condenser lens toward and away from the disk hub. The reflected light containing the information recorded on the disk passes through the optical elements in a reverse direction. It passes through the condenser lens, reflects off the mirror, and separates at the beam splitter where a portion travels to the photoelectric conversion element to create an electrical signal.

It is impossible, however, to fabricate the disk with complete flatness and, even if the disk is completely flat, it may impossible to mount it on a shaft of the motor without some tilting. Therefore, when the disk is rotated under such a tilted mounting condition, the disk may be vertically fluctuated, that is, the disk may move toward and away from the condenser lens causing the light to alter in focus. To accurately read out information from the disk, the condenser lens must be moved to initially acquire focus of the light on the surface of the disk, and then the lens must be controlled to maintain this focus as the disk position fluctuates vertically.

In order to acquire and maintain focus in a system of this type, an astigmatic focus system is often used. As shown in FIG. 1, a cylindrical lens is provided to receive a portion of the light from the beam splitter. The light passed through the cylindrical lens is received by a quad detector which comprises four segments, A, B, C, and D as shown in FIG. 2. The segments are arranged such that a straight line connecting the centers of segments A and B and a straight line connecting the centers of segments C and D are perpendicular to each other and one of the straight lines is oriented in the same direction as the longitudinal axis of the cylindrical lens. Because a light beam, after passing through a cylindrical lens, has one focus point for light in a plane including the horizontal axis of the lens and a different focus point for light in a plane including the vertical axis of the lens, contours of light projected onto the light receiving segments A through D of the light receiving element are different, so that the positional relation between the recording surface and the condenser lens can be determined by using the difference in the outputs of the quad detector.

That is, the light receiving surface of the quad detector is positioned so that when the focus point of the condenser lens is at a position in the plane of the recording surface of the disk, the contour of the reflected light after being passed through the cylindrical lens becomes substantially a circle, as shown in FIG. 3A. In case the incident light is focused behind the recording surface as shown by the dotted lines in FIG. 4, that is, the distance between the recording surface and the condenser lens is too small, the contour of the light striking the quad detector is an ellipse as shown in FIG. 4A, with the majority of the light falling on segments C and D. On the other hand, in case the incident light is focused in front of the recording surface, as shown by the dotted lines in FIG. 5, that is, the distance between the condenser lens and surface is too long, the light striking the quad detector creates an ellipse with the majority of the light falling on segments A and B as shown in FIG. 5A. Accordingly, if the light is properly focused on the disk surface, the output of all four segments of the quad detector will be equal. However, if the light is focused behind the disk surface the output of segments C and D will be larger than the output of segments A and B, and if the light is focused in front of the recording surface, the output of segments A and B will be larger than the outputs of segments C and D. This information can be used to control the movement of the condenser lens and keep the light properly in focus on the surface of the disk.

While this concept works to maintain focus of the light on the disk, acquiring focus initially requires a somewhat different method. The error signal output of a typical prior art quad detector signal processing circuit as shown in FIG. 6, produces the waveform shown in FIG. 7A. This signal is used to acquire as well as to maintain focus. The waveform shown in FIG. 7B is the summation of the signal from all four elements of the quad detector. Proper focus occurs at the point where the waveform in FIG. 7B peaks, which is also the crossover point of the waveform in FIG. 7A. Because the peak of the waveform in FIG. 7B is a very broad peak, it alone is not sufficient for acquiring focus. Proper focus is acquired when the signal illustrated by the waveform of FIG. 7B is above the threshold shown in FIG. 7B and also the signal shown in FIG. 7A is between the two thresholds shown. Because the waveform in FIG. 7A must be between the thresholds, when the condenser lens is moving in one direction, the positive threshold must be checked whereas if the lens is moving in the other direction, the negative threshold must be checked. Therefore, acquisition of focus in typical prior art devices requires the measuring of three separate thresholds. In addition, since the waveform of FIG. 7B is the sum of the voltages from all four segments, the amount of reflectivity from the disk affects where this threshold has to be placed. That is, a disk that reflects more light requires a higher threshold, and a disk that reflects less light requires a lower threshold. Because of this, the threshold for the signal is FIG. 7B has to be a variable threshold calculated for each individual disk.

The problems of conventional focus servo apparatus as described and shown in FIGS. 1–7 are that focus acquisition requires the measuring and detection of three thresholds having both positive and negative values. In addition, one of these threshold values has to be calculated for each disk since it is sensitive to reflectivity changes from one disk to another. Therefore, there is need in the art for an improved focus acquisition and maintenance system that requires only one threshold and is insensitive to reflectivity changes in the disk media.

SUMMARY OF THE INVENTION

It is an object of the present invention to provide an apparatus and method to acquire focus in an optical disk storage device that requires only one threshold comparison.

It is a further object of the present invention to provide a focus acquisition system that is insensitive to reflectivity changes in the various disks used to record data.

It is a still further object of the present invention to provide a focus acquisition system that is insensitive to the direction the condenser lens is moving in order to acquire focus.

The preceding and other objects of the invention are realized through the use of an improved astigmatic focus system having a condenser lens focusing the coherent light onto the disk surface, a cylindrical lens for receiving reflected light from the surface and rendering this light asymmetrical, a quad detector for receiving the asymmetrical light and converting it to electrical signals, a controller circuit for converting the electrical signals to a value and comparing this value to a threshold in order to determine when the light is near focus, a fine focus system to maintain focus once focus is acquired, and a switch circuit to allow the controller to connect the fine focus system to the quad detector output and allow the fine focus system to take over control of the consenser lens once a near focus condition is detected.

The present invention also includes a method of acquiring and maintaining focus in an optical disk storage system that includes the steps of shining a coherent light through a condenser lens onto the surface of the disk, rendering the reflected light from the surface asymmetrical, converting this asymmetrical light into electrical signals, measuring the electrical signals and adjusting the condenser lens in response to the electrical signals until the coherent light is approximately in focus, and connecting the electrical signals to a fine focus means to maintain focus of the coherent light on the disk surface.

DETAILED DESCRIPTION OF THE INVENTION

The following is a description of the best presently contemplated mode of carrying out the present invention. This description is given only to illustrate the general principles of the invention and is not to be taken in a limiting sense. The true scope of the invention can be ascertained by reading the appended claims.

Figure 1:
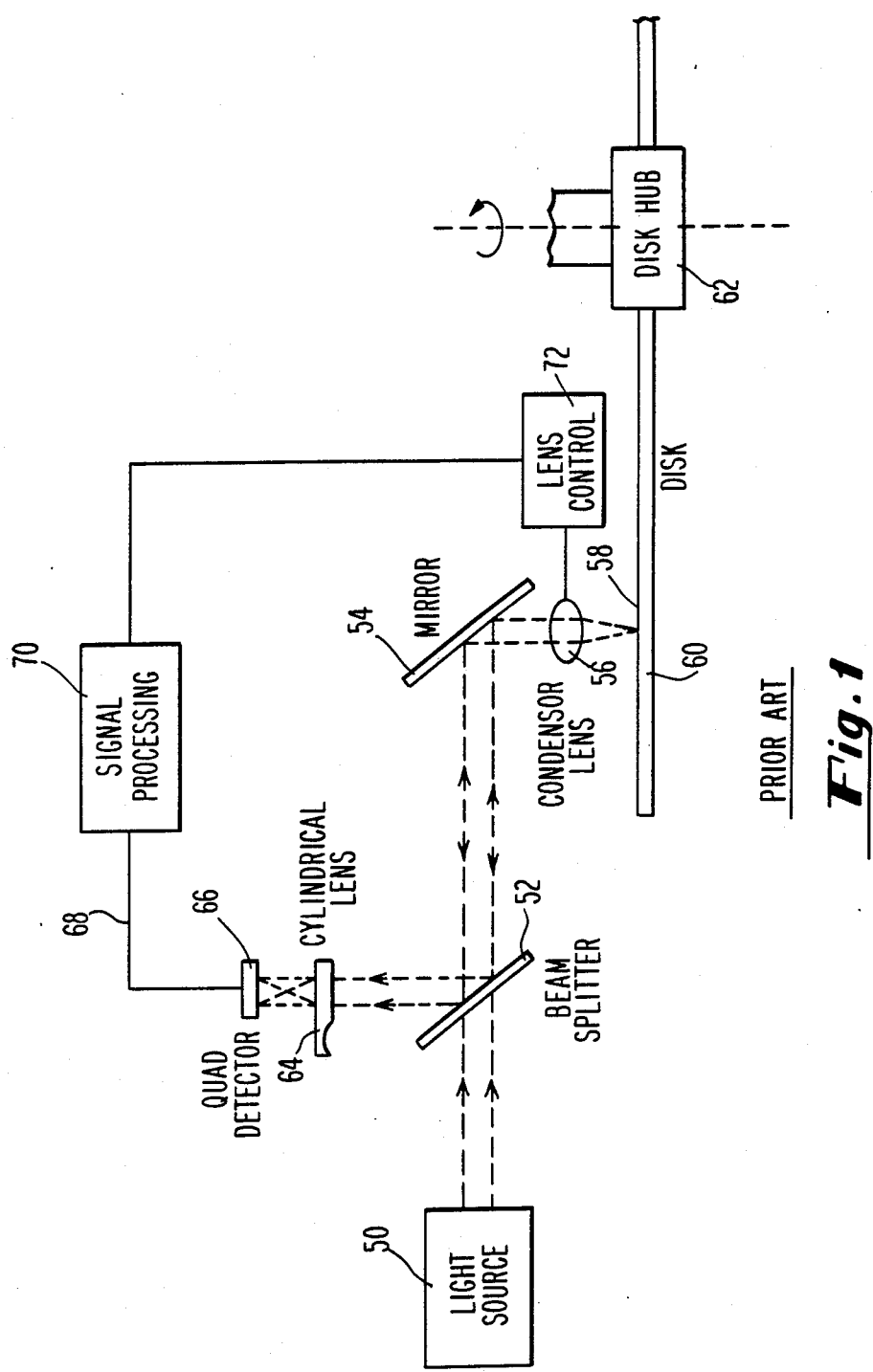
FIG. 1 is a schematic view of a prior art astigmatic focus system used in an optical disk recording device.

FIG. 1 is an example of the conventional focus servo apparatus, in which a light beam emitted from a light source 50, such as a helium neon laser, is passed through a beam splitter 52, reflected from a movable mirror 54, and condensed by a condenser lens 56 to a point on the recording surface 58 of the disk 60. The disk 60 is attached to a hub 62 which is rotated by a motor (not shown). The reflected light modulated by the information recorded on the disk surface 58 passes through the optical elements in the reverse direction, and separates at the beam splitter 52 where a portion passes through the cylindrical lens 64 and shines on the quad detector 66 which converts the light into an electrical signal 68. The electrical signal 68 is processed by the signal processing electronic circuit 70 and passed to the lens control circuitry 72 to move the condenser lens 56 in order to acquire and maintain focus of the light beam on the surface 58 of the disk 60.

It is virtually impossible, however, to fabricate the disk surface with complete flatness and even if the disk surface is completely flat, it may be impossible to mount it on the hub 62 without some tilting. Therefore, the disk surface 58 may vertically fluctuate by its unevenness or by rotating under a tilted mounting condition. In order to read out the information on the fluctuating disk correctly, the condenser lens 56 must be moved to follow the fluctuation and thereby condense the light at the exact point on the recording surface 58 of the disk 60 as the disk fluctuates. To this end the cylindrical lens 64 is provided to receive the split light from the beam splitter 52. The light passed through the lens 64 is received by a quad detector 66. The quad detector, as better shown in FIG. 2, comprises four segments 66a, 66b, 66c, and 66d. The segments are arranged such that a straight line connecting centers of light receiving faces of the segments 66a and 66b and a straight light connecting centers of light receiving faces of the segments 66c and 66d are orthogonal to each other and either one of the straight lines is oriented in the same direction as a longitudinal axis of the cylindrical lens 64. A light beam after passing through the cylindrical lens 64 has two different focus positions, one in the plane of the horizontal axis of the lens and one in the plane of the vertical axis of the lens. Because of this feature, contours of light projected onto the light receiving faces of the segments 66a through 66d of the quad detector 66 are different, so that the positional relation between the recording surface 58 and the condenser lens 56 can be determined by using the difference in the output of the quad detector 66.

Figure 2:
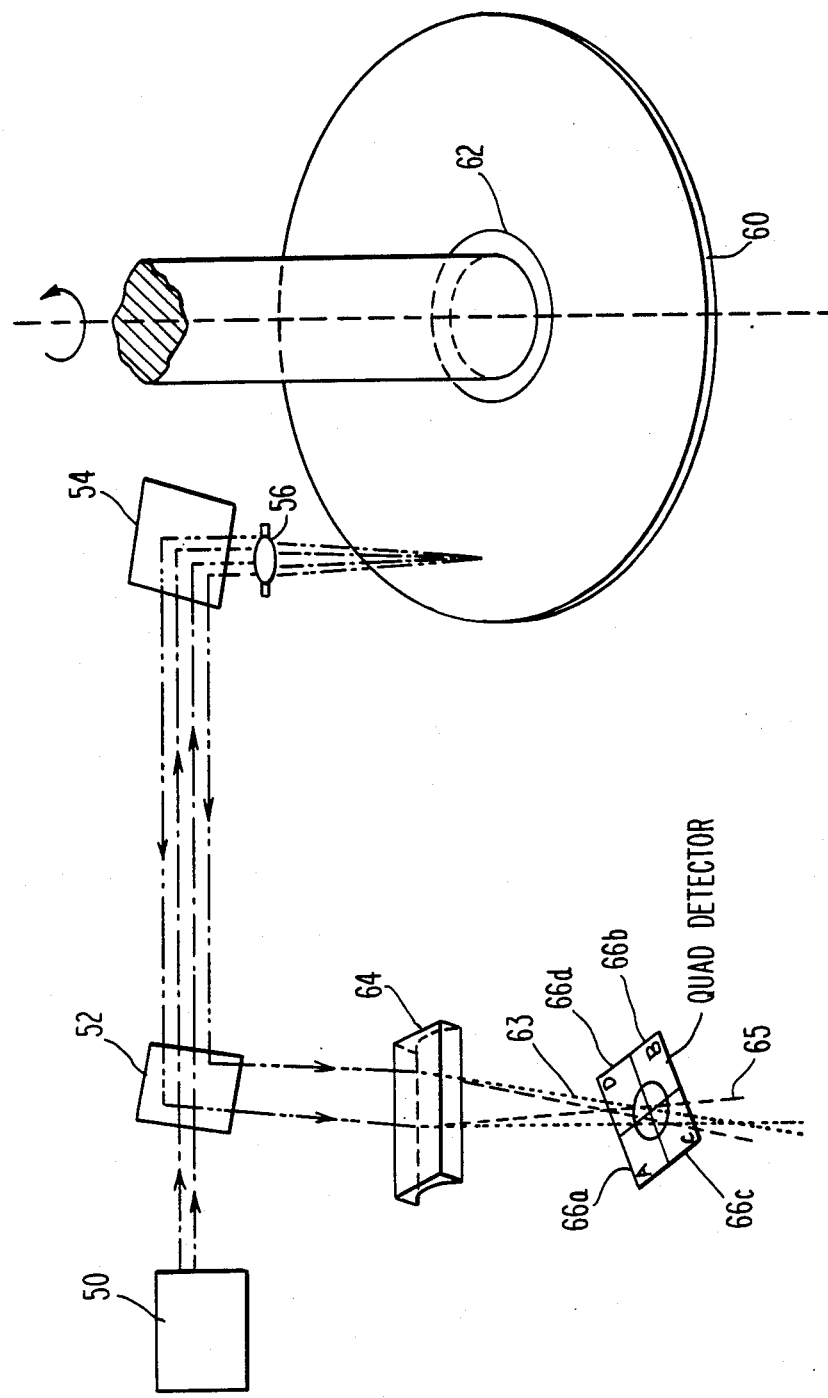
FIG. 2 is a perspective view of the astigmatic focus system shown in FIG. 1.

FIG. 2 shows a perspective view of a conventional focus servo apparatus. Light emitted from the coherent light source 50, as illustrated by the dash-dot lines, passes through a beam splitter 52 to reflect off a mirror 54, and passes through a condenser lens 56 to a focus point on the surface of the disk 60. The reflected light, as shown by the dash-double-dot lines, passes back through the condenser lens 56, reflects off the mirror 54, separates at the beam splitter 52 to shine through the cylindrical lens 64. The cylindrical lens 64 causes the light in the horizontal polarization, as illustrated by the dotted line 63, to focus at a different point from the light in the vertical polarization, as illustrated by the dashed line 65. FIG. 2 shows the light in proper focus on the surface of the disk, therefore the vertically polarized light focuses in front of the quad detector 66, while the horizontally polarized light focuses behind the quad detector 66, with the result being a circle of light on the surface of the quad detector 66.

Figure 3:
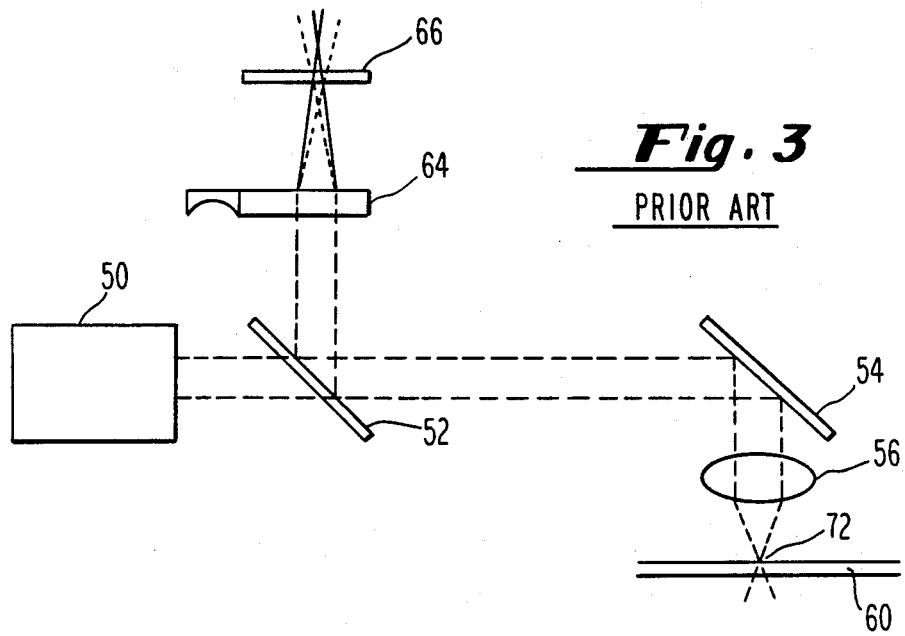
FIG. 3, including 3A are, diagrams of the astigmatic focusing system wherein the light is properly focused.
Figure 3A:
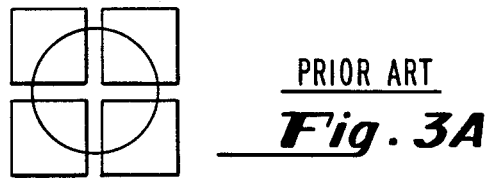

FIG. 3 shows the light receiving surface of the quad detector 66 positioned so that when the focus point of the lens 56 is at a position in the plane of the recording surface of the disk 60, as illustrated at 72, the contour of the reflected light after being passed through the cylindrical lens 64 becomes substantially a circle on the face of the quad detector, as illustrated by FIG. 3A. With the light in focus as illustrated in FIG. 3, outputs of the respective light receiving segments 66a, 66b, 66c, and 66d are approximately equal.

Figure 4:
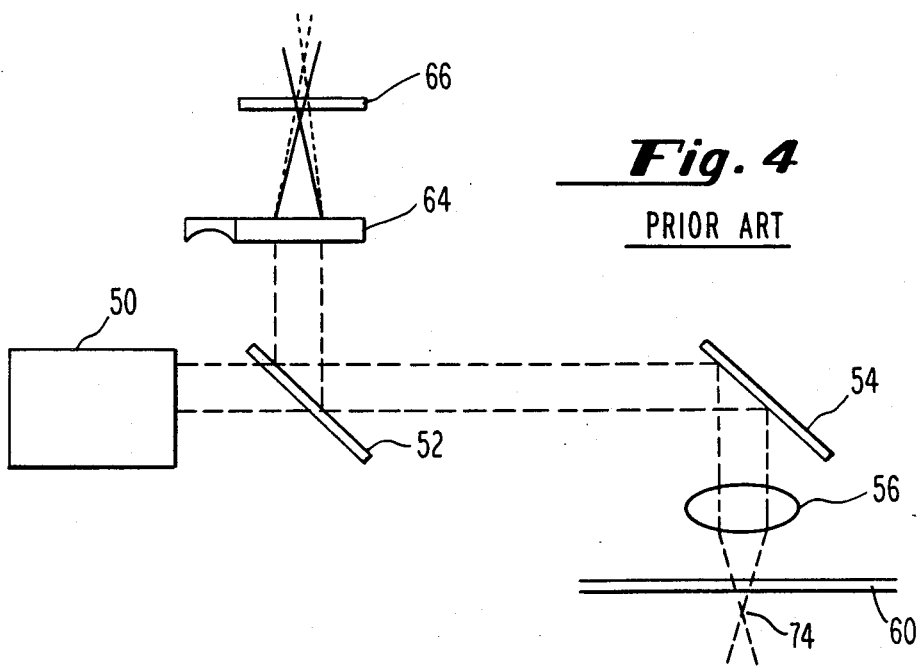
FIG. 4, including 4A are, diagrams of the astigmatic focusing system with the light improperly focused behind the disk.
Figure 4A:
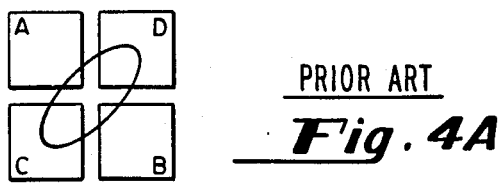

FIG. 4 illustrates the servo system wherein the light is focused behind the disk. The light from eight source 50 passes through the beam splitter 52 and reflects off the mirror 54 to be condensed by the lens 56 at a focus point behind the disk 60 at position 74. The out of focus light is reflected back through the lens 56, off the mirror 54, split by the beam splitter 52, to pass through the cylindrical lens 64 and project onto the quad detector 66. FIG. 4A illustrates an ellipse pattern which is the result of this out of focus condition wherein the light is focused behind the disk. In this focus condition, the outputs of the segments 66a and 66b are less than the outputs of 66c and 66d.

Figure 5:
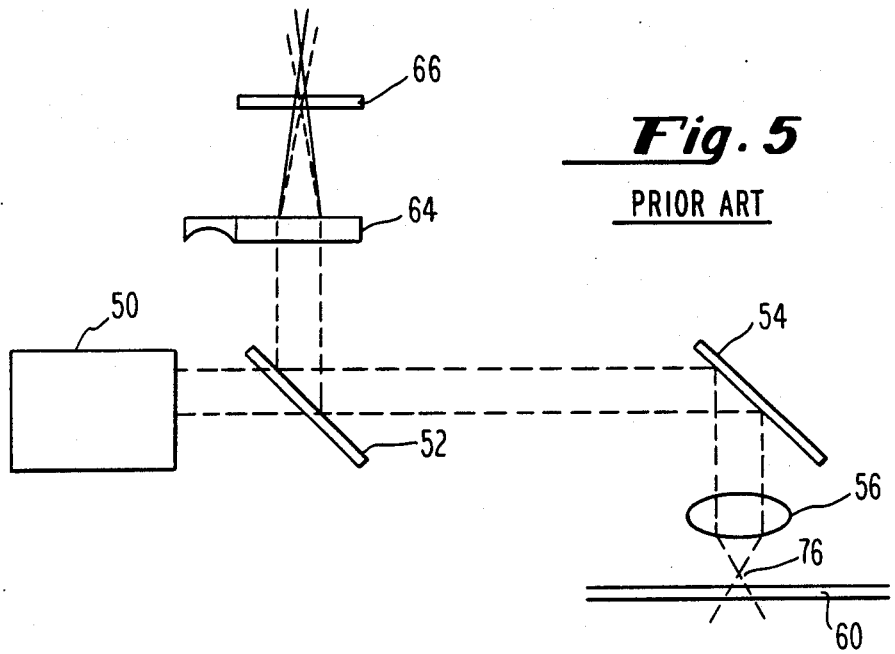
FIG. 5, including 5A, is a diagram of the astigmatic focusing system with light improperly focused in front of the disk.
Figure 5A:
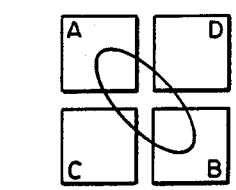

FIG. 5 illustrates an out of focus condition wherein the light is focused in front of the disk. Light is emitted from the light source 50 and passes through the beam splitter 52 to reflect off the mirror 54 and be condensed by the lens 56 to a focus point 76 in front of the disk 60. This out of focus light reflects back through the lens system, separates at the beam splitter to pass through the cylindrical lens 64 and form a pattern on the quad detector 66. The pattern formed by the light in this focus condition is illustrated in FIG. 5A. With the light in this focus condition, the output of segments 66a and 66b is greater than the output of segments 66c and 66d of the quad detector 66.

These characteristics of the light patterns formed on the quad detector 66 can be used to generate an error signal which is itself used in a servo system to control the position of the lens 56.

Figure 6:
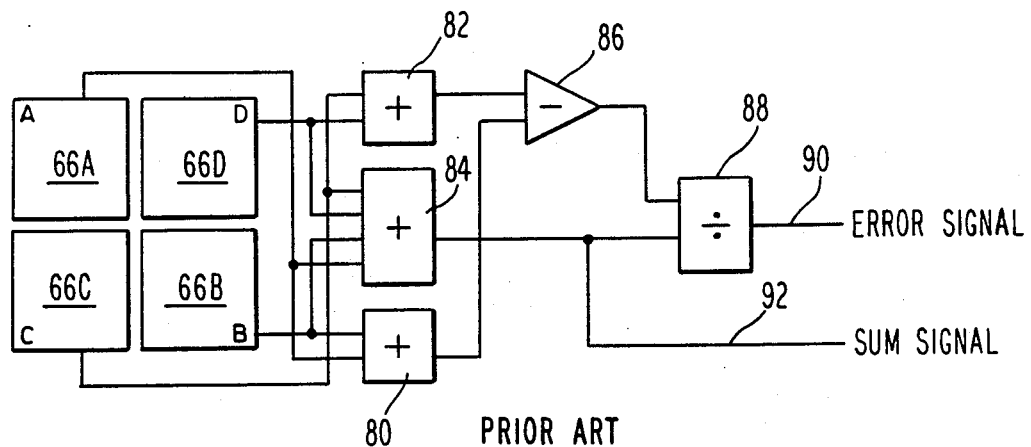
FIG. 6 is a diagram of a prior art signal processing circuit for use with a quad detector.

FIG. 6 illustrates a prior art circuit which is used to form an error signal 90 from the quad detector 66. The outputs of the light receiving segments A and B are fed to a summing circuit 80. The outputs of the light receiving segments C and D are fed to a summing circuit 82. The outputs of all four light receiving segments A, B, C, and D, are fed to a summing circuit 84. The outputs of the summing circuit 80 and the summing circuit 82 are fed to a difference circuit 86 whose output is fed to a divider circuit 88. The other input to the divider circuit 88 comes from the summing circuit 84. The output of the divider circuit 88 is the error signal 90 which is passed to the lens control circuit 72 to control the lens 56. The equation for this circuit is as follows:

$$\frac{(A + B) - (C + D)}{(A + B + C + D)} = \text{error signal}$$

The output of the difference amplifier 86 must be divided by the sum of all four light receiving segments to normalize the signal so that a lesser or greater intensity of the laser light beam is cancelled before the error signal is created. The sum signal 92 is typically used in acquiring initial focus of the light beam on the surface 58 of the disk 60 as described more fully herein below.

Figure 7A:
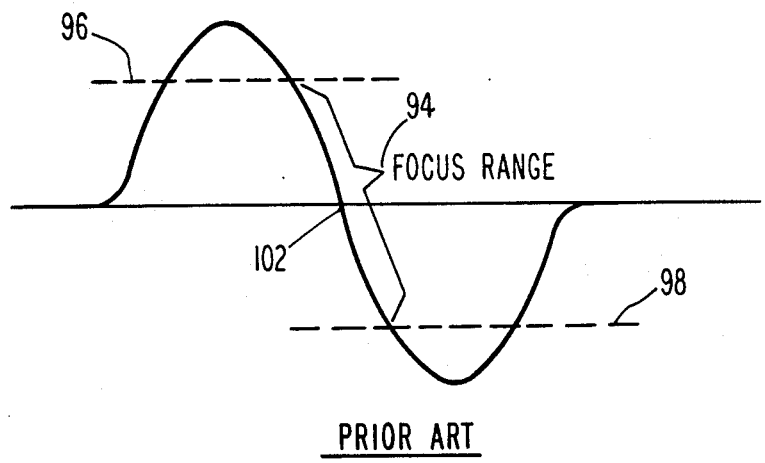
FIG. 7A and FIG. 7B show the waveforms output by the circuit shown in FIG. 6.
Figure 7B:
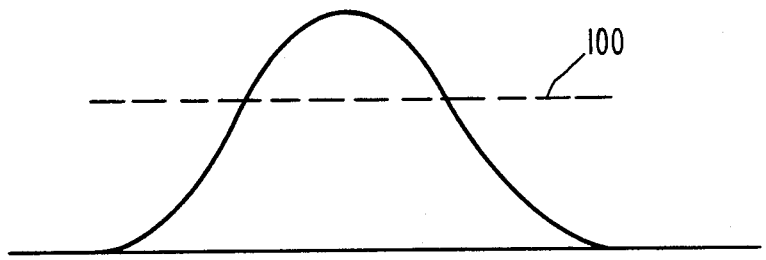

FIG. 7A is a waveform diagram of the error signal 90 that is generated by the processing circuit shown in FIG. 6. FIG. 7B is a waveform diagram of the sum signal 92 that is generated by the processing circuit shown in FIG. 6. These two signals taken together can be used to acquire focus in the system illustrated in FIG. 1. FIG. 7A illustrates the error signal 90 when the lens 56 is moved from a position very near the disk 60 through the proper focus position and on to a position very far away from the disk 60. FIG. 7B illustrates the sum signal 92 as the lens 56 is moved in the same manner. Proper focus occurs when the error signal 90 is within the range between thresholds 96 and 98 as illustrated by the focus range area 94, and the error signal 90 crosses the zero axis at point 102. In order to get the lens 56 to this position the lens 56 is typically moved to a point as far away from the disk 60 as possible and then moved slowly toward the disk 60 until the error signal 90 goes below the threshold 98 and the sum signal 92 exceeds the threshold 100 shown in FIG. 7B. Another conventional way of acquiring focus is to move the lens 56 as close to the disk 760 as possible, and then move the lens 56 away from the disk 60 until the threshold 96 is exceeded by the error signal 90 and the threshold 100 is exceeded by the sum signal 92. Because the lens 56 may be coming into focus from either direction, both the positive threshold 96 and the negative threshold 98 must be checked and the threshold 100 of the sum signal 92 must also be checked in order to determine a near focus condition. Since the error signal 90 (FIG. 6), also shown in FIG. 7A, is computed using a normalized value, the thresholds 96 and 98 can be preset thresholds when the machine is manufactured. However, the sum signal 92 (FIG. 6), also shown in FIG. 7B, is simply the sum of the outputs of all four light receiving segments and therefore this threshold will vary depending on the intensity of the laser beam as well as the relative focus position of the laser beam. To compensate for this, the threshold 100 must be dynamically adjusted for the light intensity of the laser beam.

Figure 8:
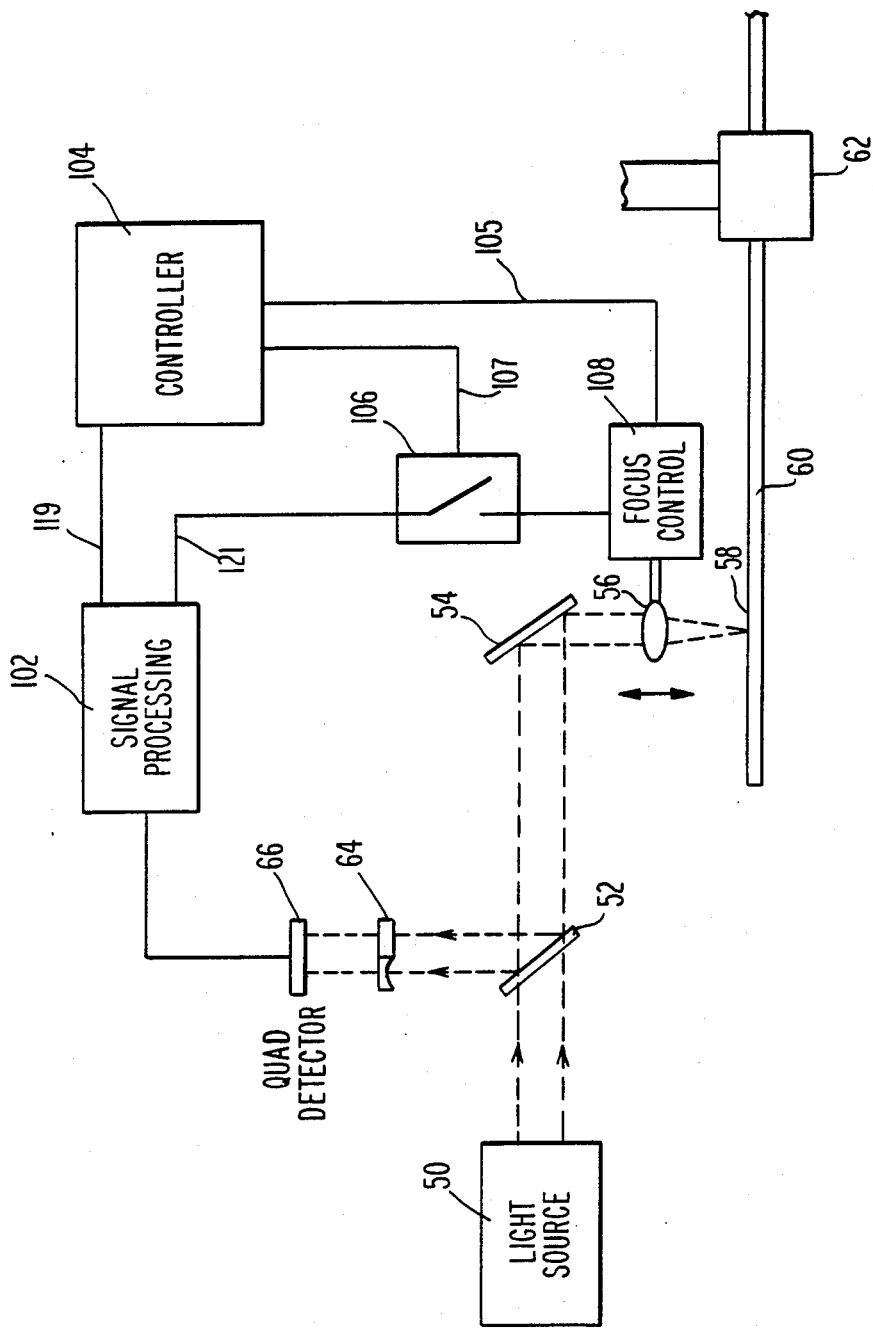
FIG. 8 shows an astigmatic focus system in accordance with the present invention.

The circuit shown in FIG. 8, the preferred embodiment of the present invention, solves the above-described problems in acquiring focus. As is conventional, light from the light source 50 passes through the beam splitter 52, reflects off the mirror 54, and condenses through the lens 56 to a focus point on the surface 58 of the disk 60. Light reflects back through the lens 56, off the mirror 54, and splits at the beam splitter 52 to pass through the cylindrical lens 64 and form a pattern on the quad detector 66. The output of the quad detector 66 is processed by the signal processing circuit 102 which not only generates a normalized sum signal 119 that is fed to a controller circuit 104, but also generates an error signal 121 that is fed to a switch circuit 106. The controller circuit 104 sends a first control signal 105 to the focus control circuit 108 to move the lens 56 toward and away from the disk 60 until the controller circuit 104 determines that the lens 56 is approximately in focus and then the controller circuit 104 sends a second control signal 107 to close the switch element 106 and connect the error signal 121 to the focus control circuit 108. The focus control circuit 108 then maintains the lens 56 at a position which will keep the light from the light source 50 in focus on the surface 58 of the disk 60. Those skilled in the art will recognize that the controller circuit 104 could be realized using a conventional microprocessor and they would be able to program and operate it using the description herein.

Figure 9:
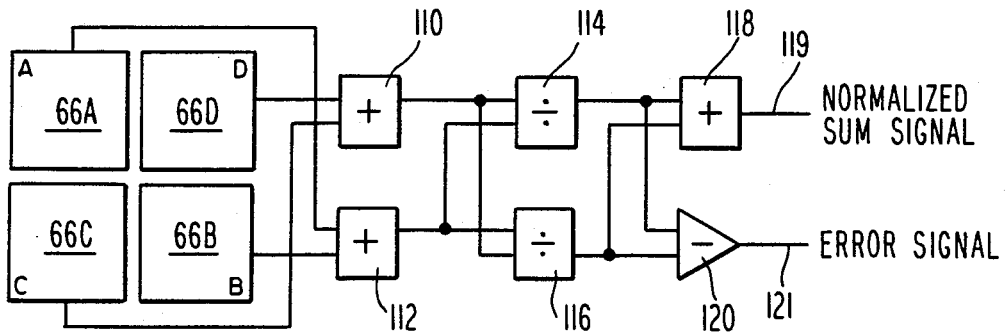
FIG. 9 shows the signal processing circuitry of FIG. 8.

FIG. 9 illustrates the circuit schematic diagram of the signal processing circuit 102. The outputs of the light receiving elements A and B are fed to a summing circuit 112. The outputs of the light receiving segments C and D are fed to a summing circuit 110. The output of the summing circuits 110 and 112 are fed to divider circuits 114 and 116. The outputs of the divider circuits 114 and 116 are summed by the sum circuit 118 to produce a normalized sum signal 119 and are subtracted by the difference circuit 120 to produce an error signal 121. The equations that result from this circuit are as follows:

$$\text{error signal} = \frac{(A+B)}{(C+D)} - \frac{(C+D)}{(A+B)}$$

$$\text{normalized sum signal} = \frac{(A+B)}{(C+D)} + \frac{(C+D)}{(A+B)}$$

Figure 10:
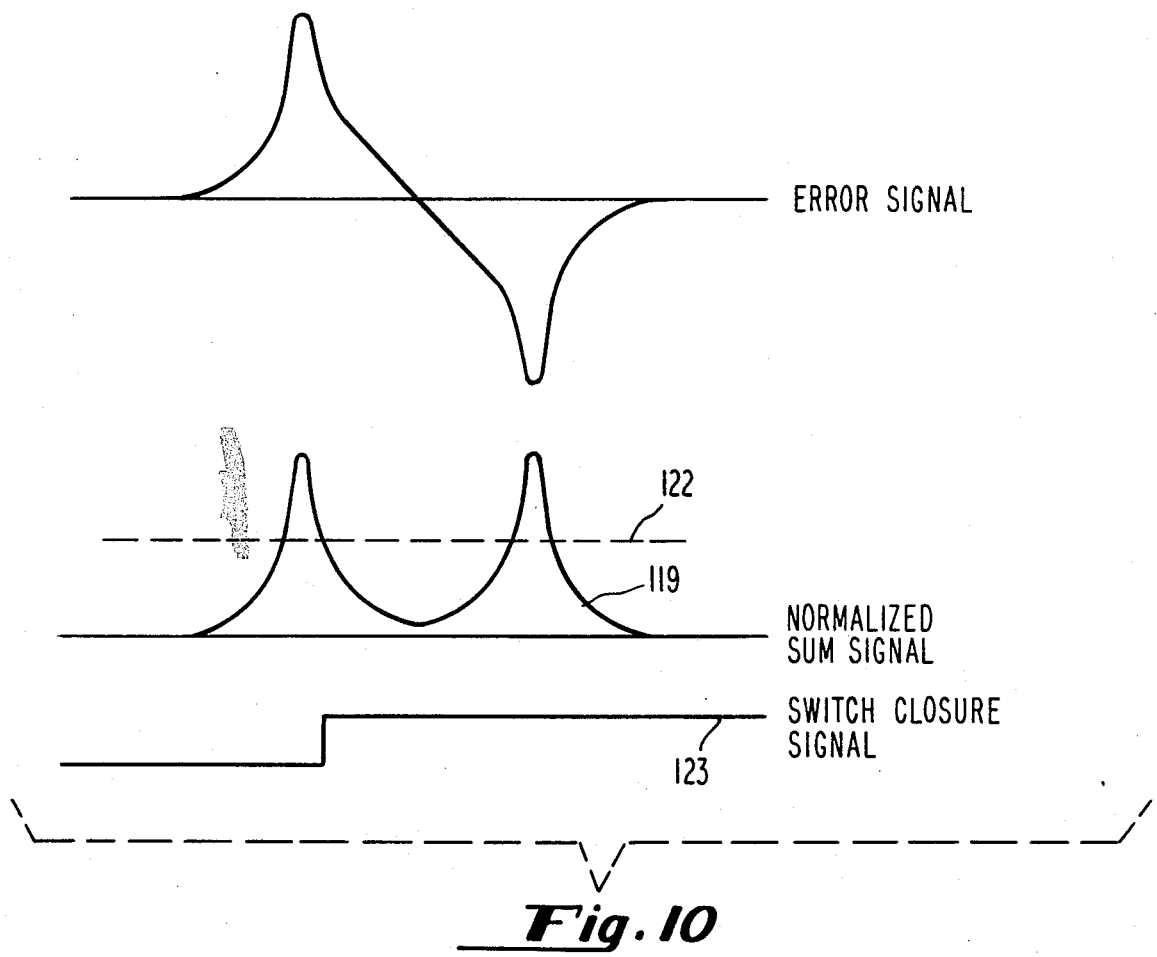
FIG. 10 shows the waveforms output by the signal processing circuit of FIG. 9.

Waveform diagrams of the error signal 121 and normalized sum signal 119 are shown in FIG. 10. The error signal 121 is similar to the error signal 90 of FIG. 7A although the peaks are sharper than the error signal 90 shown in FIG. 7A. This error signal 121 can be used by the focus control circuit 108 in a manner identical to the use of the error signal 90 shown in FIG. 7A by the lens control circuit 72 illustrated in FIG. 1. The normalized sum signal 119 as illustrated in FIG. 10, however, is significantly different from the sum signal 92 shown in FIG. 7B. In the normalized sum signal 119 of FIG. 10, the amplitude of the signal will not change with the intensity of the laser shining on the disk, but will only change with the relative focus position of the laser light on the disk. As a result of this, a single threshold 122 applied to the normalized sum signal 119 of FIG. 10 can be used to acquire focus. Because the amplitude of this normalized sum signal 119 does not vary with respect to the intensity of the laser light, due to the denominator terms of the normalized sum signal equation, the threshold 122 illustrated in FIG. 10 can be a fixed threshold determined when the circuit is designed. Furthermore, the lens 56 can be started toward the focus point either from a point very close to the disk or from a point very far away from the disk and when the normalized sum signal exceeds the threshold 122 and then drops below this threshold, the lens is in proximity of focus. The switch circuit 106 can then be used to connect the error signal 121 to the focus control 108, thus overcoming the need to measure three separate threshold circuits in order to determine proximity of focus. The switch closure signal 123 shown in FIG. 10 corresponds to the second control signal 107 which is used to close the switch 106 (FIG. 8) when proximity of focus is attained.

Figure 11:
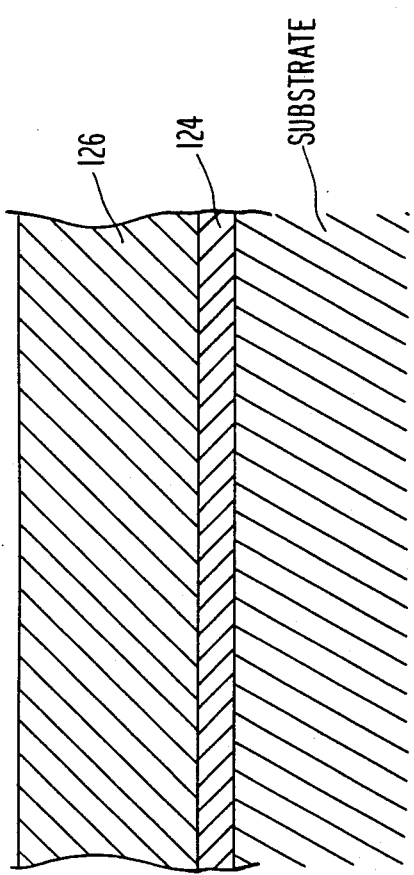
FIG. 11 shows generally the makeup of the optical media used in optical disk recording systems.
Figure 12:
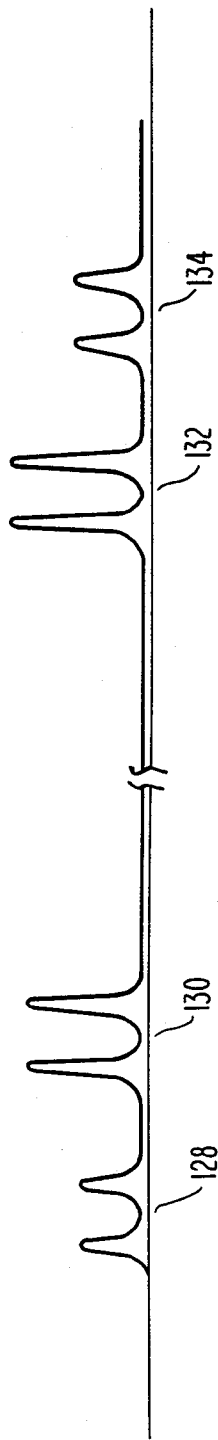
FIG. 12 shows the waveform output by the present invention as the condenser lens is moved to its innermost point and then moved back out from the surface of the disk.

FIG. 11 illustrates a cross section of the disk 60, showing the information layer 124 made of a thin active layer and a clear protective overcoat 126. Typically the active layer 124 will reflect 18% of the light striking it, while the overcoat layer 126 reflects only 4%. However, since the present invention is insensitive to the intensity of the reflected light, a false focus condition can occur wherein the lens 56 focuses the laser beam on the surface of the overcoat layer 126 rather than on the surface of the active layer 124. FIG. 12 illustrates the normalized sum signal 119 as the lens 56 is moved from a position furthest away from the disk, in toward the disk to a position closest to the disk and then is moved from that position back to a point furthest away from the disk. As the lens moves from a position furthest away from the disk toward the disk, the signal at 128 occurs when the light first focuses on the overcoat layer 126. As the lens is moved further towards the disk the signal at 130 occurs when the light focuses on the active layer 124. As the lens moves from the innermost position to the outermost position the signal at 132 occurs as the light focuses on the active layer 124 a second time and as the lens is moved even further out the signal at 134 occurs as the light focuses on the overcoat layer 126 a second time.

The method of the present invention used to avoid a false focus on the overcoat is to move the lens to a point nearest the disk before attempting to acquire focus. The lens is then moved away from the disk until the sum signal 119 first exceeds the threshold 122. Since the lens was very close to the disk and is now moving away from the disk the first focus point will occur on the active layer 124, as illustrated by the signal at 132, thus a false focus will not occur with the present invention.

While the invention herein disclosed has been described by means of a specific embodiment and application thereof, numerous modifications and variations could be made thereto by those skilled in the art without departing from the spirit and scope of the present invention. It is therefore to be understood that within the scope of the appended claims, the invention may be practiced otherwise than as specifically described herein.

What is claimed is:

1. Focus apparatus for acquiring and maintaining focus of a coherent light beam on a reflective surface, said apparatus comprising:
   first lens means for focusing said coherent light onto said reflective surface;
   cylindrical lens means for receiving coherent light reflected from said surface and rendering said reflected light asymmetrical;

light detecting means for receiving and converting said asymmetrical light into a first and second control signals;

focus detection means responsive to said first control signal for generating a third control signal representative of a desired near focus condition and for generating a fourth control signal for moving said first lens means;

lens actuator means responsive to said second and fourth control signals for controlling the position of said first lens means and for maintaining said coherent light in focus on said surface; and switch means, responsive to said third control signal, for selectively coupling said second control signal to said lens actuator means;

whereby said coherent light passes through said first lens means, reflects from said surface, passes through said cylindrical lens means, strikes said light detecting means which converts said light to a first control signal that is used by said focus detection means to produce a fourth signal to move said first lens until a near focus condition is detected whereupon said third control signal is generated to close said switch means to connect said second control signal to said lens actuator means and allow said lens actuator means to maintain focus of said coherent light on said surface.

2. Focus apparatus as defined in claim 1 wherein said light detecting means comprises:

first and second pairs of descrete light receiving segments, each segment producing a detection signal representative of the light received thereon, said first pair of segments having centers arranged on a first line and said second pair of segments having centers arranged on a second line perpendicular to said first line wherein one of said lines is aligned with the longitudinal axis of said cylindrical lens;

signal processing means for generating said first and second control signals in response to said detection signals, said first control signal having a maximum value associated therewith when the light received on said segments is substantially in focus and said second contral signal having a zero crossing value associated therewith when the light received on each of said segments is substantially in focus.

3. Focus apparatus as defined in claim 2 wherein said signal processing means comprises:

a first summation circuit to form a first sum of the detection signals of said first pair of said segments;

a second summation circuit to form a second sum of the detection signals of said second pair of said segments;

a first divider circuit to divide said first sum by said second sum;

a second divider circuit to divide said second sum by said first sum;

a difference circuit to subtract said second divider circuit output from first divider circuit output to produce said second control signal; and a third summation circuit to add said first divider circuit output to said second divider circuit output to produce said first control signal.

4. The focus apparatus as defined in claim 3 wherein said focus detection means comprises:

receiving means for receiving said first control signal;

measuring means for measuring said first control signal and outputting a third control signal when the value of said first control signal exceeds a predetermined threshold; and means for outputting a fourth control signal to cause said lens actuator means to move said first lens in first and second directions.

5. The focus apparatus as defined in claim 4 wherein said measuring means comprises a microprocessor.

6. Focus apparatus for use in an optical data storage system, said system using a recording medium having a surface containing at least one recording track, said apparatus comprising:

a source of coherent light;

a first lens means for focusing light from said coherent light source onto said surface;

a cylindrical second lens means for receiving light reflected from said surface and rendering said reflected light asymmetrical;

light receiving means for receiving and converting said asymmetrical light into first and second control signals;

focus proximity detection means responsive to said first control signal for generating a third control signal representative of a proximity of focus condition and for generating a fourth control signal for adjusting the position of said first lens;

lens adjustment means responsive to said second control signal for adjusting the position of said first lens means to maintain said light in focus on said surface of said recording medium, said lens adjustment means also being responsive to said fourth control signal output of said focus proximity detection means; and switch means responsive to said focus proximity detection means third control signal for selectively coupling said second control signal to said lens adjustment means;

whereby said coherent light passes through said first lens means, impinges on said surface, reflects from said surface through said cylindrical second lens means to strike said light receiving means and create said first control signal used by said focus proximity detection means which sends said fourth control signal to cause said lens adjustment means to move said first lens means until said light is approximately in focus at which time said focus proximity detector means sends said third control signal to close said switch means to couple said second control signal to said lens adjustment means to maintain said coherent light in focus on said surface.

7. The focus apparatus as defined in claim 6 wherein said cylindrical lens means is a divergent lens.

8. The focus apparatus as defined in claim 7 wherein said light receiving means comprises:

first and second pairs of discrete light receiving segments, each segment producing a detection signal representative of the amount of light received thereon, said first pair of segments having centers arranged on a first line and said second pair of segments having centers arranged on a second line perpendicular to said first line wherein one of said lines is aligned with a longitudinal axis of said cylindrical second lens;

signal processing means for generating said first and second control signals in response to said detection signals, said first control signal having a maximum value associated therewith when the light received on said segments is approximately in focus and said second control signal having a zero crossing value associated therewith when the light received on said segments is substantially in focus.

9. The focus apparatus as defined in claim 8 wherein said signal processing means comprises:
   a first summation circuit to form a first sum of the detection signals of said first pair of said segments;
   a second summation circuit to form a second sum of the detection signals of said second pair of said segments;
   a first divider circuit to divide said first sum by said second sum;
   a second divider circuit to divide said second sum by said first sum;
   a difference circuit to subtract said second divider circuit output from said first divider circuit output to form said second control signal; and
   a third summation circuit to add said first divider circuit output to said second divider circuit output to produce said first control signal.

10. The focus apparatus as defined in claim 9 wherein said focus proximity detection means comprises:
    receiving means for receiving said first control signal;
    means for measuring said first control signal value and outputting a third control signal when said value exceeds a predetermined threshold; and
    means for outputting a fourth control signal to cause said lens adjustment means to move said first lens in first and second directions.

11. The focus apparatus as defined in claim 10 wherein said measuring and outputting means comprises a microprocessor.

12. In an optical disk storage system including a recording medium having a surface containing at least one recording track, a method of acquiring and maintaining focus of a coherent light beam, comprising the steps of:
    (a) shining a coherent light through a first lens onto said surface;
    (b) rendering light reflected from said surface asymmetrical;
    (c) converting said asymmetrical light into electrical signals by;
        aligning a first pair of discrete light receiving segments to the longitudinal axis of a cylindrical second lens means wherein each segment of said pair produces an output signal;
        aligning a second pair of discrete light receiving segments at a right angle to said first pair of discrete light receiving segments wherein each segment of said pair produces an output signal;
        summing said output signals of said first pair of discrete light receiving segments to create a first sum;
        summing said output signals of said second pair of discrete light receiving segments to create a second sum;
        dividing said first sum by said second sum to create a first divided sum;
        dividing said second sum by said first sum to create a second divided sum;
        subtracting said second divided sum from said first divided sum to produce a first electrical signal; and
        summing said first divided sum and said second divided sum to produce a second electrical signal;
    (d) measuring said second electrical signals and adjusting said first lens in response thereto until said coherent light is in proximity of focus by:
        converting said second electrical signal into a second electrical signal value;
        comparing said second electrical signal value to a predetermined threshold value;
        outputting a third electrical signal to move said first lens in a first direction until said first lens reaches a predetermined stop position;
        moving said first lens in a second direction until said second electrical signal value exceeds said predetermined threshold value; and
        outputting a connection signal to cause said first electrical signal to be connected to a fine focus means;
    (e) connecting said first and third electrical signals to said fine focus means; and
    (f) measuring said first and third electrical signals with said fine focus means and adjusting said first lens means to maintain said coherent light in focus on said surface.

13. The method as defined in claim 12 wherein said first direction is towards said surface of said disk recording medium and said second direction is away from said surface of said disk recording medium.

14. The method as defined in claim 12 wherein step (b) further includes the step of diverging said asymmetrical light.

* * * * *